United States Patent
Koike et al.

(10) Patent No.: US 6,654,085 B1
(45) Date of Patent: Nov. 25, 2003

(54) FRONT SCATTERING FILM WITH A LIGHT SCATTERING LAYER AND A PEELABLE SUBSTRATE

(75) Inventors: Toshihiro Koike, Urawa (JP); Hideki Etori, Urawa (JP); Yasunori Sugiyama, Yono (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 09/500,013

(22) Filed: Feb. 8, 2000

(30) Foreign Application Priority Data

Feb. 10, 1999 (JP) .......................... 11-032950

(51) Int. Cl.$^7$ .......................... G02F 1/1335
(52) U.S. Cl. ...................... 349/112; 359/599
(58) Field of Search .................. 349/104, 112, 349/137; 359/599

(56) References Cited

U.S. PATENT DOCUMENTS

| | | | | |
|---|---|---|---|---|
| 5,706,065 A | * | 1/1998 | Yano | 349/112 |
| 5,747,152 A | * | 5/1998 | Oka et al. | 428/323 |
| 5,847,795 A | * | 12/1998 | Satoh et al. | 349/137 |
| 5,903,391 A | * | 5/1999 | Toshima et al. | 359/599 |
| 5,976,297 A | * | 11/1999 | Oka et al. | 156/241 |
| 6,018,379 A | * | 1/2000 | Mizobata et al. | 349/112 |
| 6,023,316 A | * | 2/2000 | Yano | 349/112 |
| 6,111,699 A | * | 8/2000 | Iwata et al. | 359/599 |
| 6,129,980 A | * | 10/2000 | Tsukada et al. | 428/327 |
| 6,164,785 A | * | 12/2000 | Maekawa | 359/613 |
| 6,239,852 B1 | * | 5/2001 | Oono et al. | 349/112 |

FOREIGN PATENT DOCUMENTS

| | | |
|---|---|---|
| JP | 8-201802 | 1/1995 |
| JP | 9-211496 | 2/1996 |
| JP | 11-023813 | 3/1997 |
| JP | 11-080688 | 3/1997 |
| JP | 11-038208 | 7/1997 |
| JP | 11-095012 | 9/1997 |

OTHER PUBLICATIONS

Kurata," Recent Developments on Optical Films for LCDs", Proc. of SID, 1998.*
Choi et al, " A Cost Effective Method for producing Anti-–Reflction Films", Proc. of SID, 1998.*
ASIA Display 95, p. 599–602.
Technical Report of IEICE, Feb. 1996, p. 125–130.
SID 96 Digest, p. 614–617.

* cited by examiner

Primary Examiner—Kenneth Parker
(74) Attorney, Agent, or Firm—Lorusso, Loud & Kelly (57) ABSTRACT

A front scattering film capable of reducing backward scattering and providing a clear display is provided. The front scattering film comprises a light scattering layer composed of a transparent polymer binder and spherical microparticles dispersed in the binder and having a refractive index different from that of the binder, and substrates provided on the both sides of the light scattering layer, wherein at least one of the substrates is peelable from the light scattering layer. This front scattering film does not impair the function of the liquid crystal display unit by, for instance, affecting polarization, even it is used in a liquid crystal display unit in which a light scattering layer provided by the front scattering film is arranged between a retardation film or polarizer film and a liquid crystal layer.

11 Claims, 5 Drawing Sheets

FRONT SCATTERING FILM WITH A LIGHT SCATTERING LAYER AND A PEELABLE SUBSTRATE

BACKGROUND OF THE INVENTION

1. Field of the Invention

The present invention relates to a front scattering film used for reflection type liquid crystal display units. In particular, the present invention relates to a front scattering film suitable for reflection type liquid crystal display units which have a metallic mirror electrode in a liquid crystal cell and utilize it as a reflecting board, and a front scattering film of improved optical characteristics, which can be prepared by an improved manufacturing process.

2. Related Art

Reflection type liquid crystal display units have attracted attention for their high utility in portable information terminals or video cameras having liquid crystal displays since they do not require a back light source and are very much lower in electric power consumption than conventional transmission type liquid crystal display units utilizing back light. However, the currently available reflection type liquid crystal display units, especially when used in a color display, have lower brightness and contrast than transmission type displays because of the small amount of light they can utilize.

Several means have been proposed to improve the display performance of the reflection type liquid crystal display units.

Among them, the reflection type liquid crystal display unit disclosed in Japanese Patent Unexamined Publication (KOKAI) No. 8-201802/1996 has a structure comprising a mirror reflection electrode, liquid crystal layer, transparent electrode, color filter, and transparent substrate stacked in this order on which a retardation film, polarizer film and front scattering board are further stacked in this order. It is a useful reflection type liquid crystal display device because it exhibits high contrast and does not suffer from problems of viewing angle dependency, double image and the like.

The front scattering film used for a reflection type liquid crystal display device of the above-mentioned type has a single-layer structure in which spherical particles are dispersed in the film.

In such a front scattering film, not all of the particles are embedded within the film and some of them protrude from the surface. This makes it difficult to obtain a smooth surface. The particles protruding from the surface make the surface rough and cause backward scattering.

A front scattering layer for the reflection type liquid crystal display element has been also proposed (Japanese Patent Unexamined Publication (KOKAI) No. 9-211496/1997), which is prepared by applying photosensitive resin containing microparticles dispersed therein to a substrate (film, polymer sheet, glass plate, etc.), and curing the resin by UV irradiation while imparting pressure thereto by a pressing plate to smoothen the surface.

Although this process can provide a front scattering layer with a smooth surface, it requires large-scale equipment for irradiating the resin with ultraviolet rays under pressure and, therefore, does not rank as an easy process.

In addition, since the front scattering layer is formed directly on the substrate, any defect in the front scattering layer becomes a defect of the entire unit. This may lower productivity.

The inventors of the present invention previously proposed a front scattering film having transparent resin films on both sides of a light scattering layer, which can be produced with relatively simple equipment. This front scattering film can reduce backward scattering and provide a clear display.

This front scattering film has drawbacks, however, when it is applied to another type of liquid crystal display unit in which the light scattering layer is arranged between a retardation film or polarizer film and a liquid crystal layer. Specifically, if the transparent resin film used as a substrate has optical anisotropy, it may affect polarization of light and impair the function of the liquid crystal display unit.

SUMMARY OF THE INVENTION

An object of the present invention is to provide a front scattering film, which can be produced with relatively simple equipment, reduce backward scattering and provide a clear display. Another object of the present invention is to provide a front scattering film which does not impair the function of the liquid crystal display unit by, for instance, affecting polarization, even if it is used in a liquid crystal display unit in which a light scattering layer provided by a front scattering film is arranged between a retardation film or polarizer film and a liquid crystal layer.

In order to attain the above-mentioned objects, the present invention provides a front scattering film comprising a light scattering layer composed of a transparent polymer binder and spherical microparticles dispersed in the binder and having a refractive index different from that of the binder, and substrates provided on the both sides of the light scattering layer, wherein at least one of the substrates is peelable from the light scattering layer.

A front scattering film according to one embodiment of this invention is characterized in that a ratio of the refractive index n of the spherical microparticles to that of the transparent polymer binder satisfies 0.91<n<0.99.

A front scattering film according to another embodiment of this invention is characterized in that the film has a distinctness of image of 60.0% or more.

A front scattering film according to another embodiment of this invention is characterized in that thermosetting resin or ionizing radiation curable resin is used as the transparent polymer binder.

A front scattering film according to another embodiment of this invention is characterized in that adhesive resin is used for the transparent polymer binder.

A front scattering film according to another embodiment of this invention is characterized in that at least one of the substrates is formed on the light scattering layer via an adhesive resin layer.

A front scattering film according to yet another embodiment of this invention is characterized in that at least one of the substrates is a polarizer film or retardation film A front scattering film according to the present invention comprises a light scattering layer composed of a transparent polymer binder and spherical microparticles dispersed in the binder and having a refractive index different from that of the binder, wherein the light scattering layer is formed between two sheets of substrates and at least one of the substrates is peelable from the light scattering layer.

In the front scattering film of the present invention, the spherical microparticles do not protrude from the surface of the light scattering layer because the layer is sandwiched between the substrates. Accordingly, the surface of the front scattering film is not roughened and back scattering is reduced. Further, a front scattering film having reduced backward scattering can be produced with relatively simple equipment.

According to the present invention, a front scattering film having high contrast and capable of providing a clear display can be provided because the surface of the light scattering layer is not roughened and has a predetermined optical property.

According to the present invention, an optical property of the substrate does not affect the function of the liquid crystal display unit, since the front scattering film is built into the liquid crystal display unit after at least one of the substrates is peeled therefrom. Particularly, a front scattering film of this invention does not degrade the function of the liquid crystal display unit by, for example, affecting the polarized light, when it is applied to a liquid crystal display unit in which a light scattering layer provided by the front scattering film is arranged between a retardation film or polarizer film and a liquid crystal layer.

PREFERRED EMBODIMENTS OF THE INVENTION

The front scattering film 1 of this invention will be explained in more detail with reference to the drawings.

As mentioned above, the front scattering film 1 of this invention comprises a light scattering layer 2 composed of a transparent polymer binder and spherical microparticles dispersed in the binder and having a refractive index different from that of the binder, wherein the light scattering layer 2 is formed between two sheets of substrates 3 and at least one of the substrates 3 is peelable from the light scattering layer 2.

The light scattering layer 2 is prepared by dispersing, in the transparent polymer binder, spherical microparticles having a refractive index different from that of the binder.

As the transparent polymer binder, thermoplastic resins, thermosetting resins, ionization radiation curable resins and the like can be used. When the light scattering layer is to be laminated on another member after one or both of the substrates 3 is peeled off, the transparent polymer binder is preferably an adhesive resin such as a pressure-sensitive adhesive, heat-sensitive adhesive, photosensitive adhesive, or the like, in order to make the layer itself adhesive and prevent formation of an air interface. When an adhesive layer, which will be explained hereinafter, is provided between the substrate 3 and the light scattering layer 2, the transparent polymer binder may not necessarily be adhesive after peeling the substrate 3.

As the thermoplastic resin, cellulose derivatives such as acetyl cellulose, nitrocellulose, acetybutyl cellulose, ethyl cellulose, methyl cellulose, and the like, vinyl resins such as vinyl acetate and its copolymers, vinyl chloride and its copolymers, vinylidene chloride and its copolymers and the like, vinyl acetal resins such as polyvinyl formal, polyvinyl butylal, acrylic resins and its copolymers, methacrylic resins and it copolymers, polystyrene resins, polyamide resins, polyester resins, polycarbonate resins and the like are usable.

As the thermosetting resin, cross-linkable resins such as melamine resins, epoxy resins, aminoalkyd resins, urethane resins, acrylic resins, polyester resins, phenol resins and the like are usable. Among them, a urethane resin obtained by cross-link reaction of an isocyanate prepolymer and a polyol resin such as polyester polyol, polyether polyol, polycarbonate polyol, polyurethane polyol or the like is preferable because it is excellent in durability, weatherability, chemical resistance and the like.

As the ionizing radiation curable resin, a photopolymerizable prepolymer which can be bridged and cured by exposure to ionizing radiation (UV, electron beam, etc.) can be used. Examples of such prepolymer include resins having an acryl group such as epoxy acrylate, polyester acrylate, polyurethane acrylate, polyhydric alcohol acrylate and the like, and polythiolpolyen resins and the like. The prepolymer may be used alone but is preferably used together with a photopolymerizable monomer to improve bridge-curing and hardness of the cured film. In addition to these components, various additives can be added to the ionizing radiation curable resins. When UV is used for curing, a photopolymerization initiator, UV sensitizing agent and the like may be added.

Similarly to the polyurethane resins obtained by bridge reaction of polyol resin and isocyanate prepolymer, the ionizing radiation curable resins are excellent in durability, weatherability, chemical resistance and the like.

The thermoplastic resin, thermosetting resin, and ionizing radiation curable resin can be used alone but two or more kinds may be used in admixture as required.

The pressure-sensitive adhesive, generally called an adhesive, consists of a resin which exhibits adhesiveness at an ordinary temperature (20° C.) and adheres to an object when superimposed thereon and imparted with pressure. As such a resin, known adhesives can be used. Examples of such adhesives include, for example, elastomeric adhesives such as those of natural rubbers, regenerated rubbers, chloroprene rubbers, nitrile rubbers, styrene/butadiene rubbers and the like, synthetic resin adhesives such as those of silicone resins, epoxy resins, urethane resins, acyrylic resins, cyanoacrylate resins and the like, and emulsion type adhesives and the like.

The heat-sensitive adhesive consists of heat melt type resin which can be adhered to an object by heat lamination. The heat melt type resin is defined as a resin which exhibits little adhesiveness at an ordinary temperature (20° C.) but becomes adhesive by heat and adheres to an object when imparted with heat and pressure. As such a heat melt type resin, known heat melt type resins such as ethylene/vinyl acetate copolymer resins, ethylene/acryl copolymer resins, polyurethane resins, thermoplastic elastomer resins and the like can be employed.

The photosensitive adhesive consists of an ionizing radiation curable resin which shows adhesiveness at an ordinary temperature (20° C.) before exposure to ionizing radiation and is bonded strongly to an object when exposed to the ionizing radiation after being adhered to the object. As the photosensitive adhesive, ionizing radiation curable resins having a suitable adhesiveness before curing can be selected from among the aforementioned ionizing radiation curable resins.

The pressure-sensitive adhesive, heat-sensitive adhesive or photosensitive adhesive may be used alone, or two or more kinds may be used in admixture as required.

As the spherical microparticles, inorganic microparticles such as those of silica, alumina, talc, zirconia, zinc oxide, titanium dioxide and the like can be used. However, organic microparticles such as those of polymethyl methacrylate, polystyrene, polyurethane, benzoguanamine resin, silicone resin and like are preferably used, because spherical shape can be more easily obtained with these materials.

As for the particle diameter of the spherical microparticles, they preferably have a mean particle diameter of 1.0 $\mu$m-10.0 $\mu$m, more preferably 2.0 $\mu$m-6.0 $\mu$m. The mean particle diameter is defined to be 1.0 $\mu$m or more and 10.0 $\mu$m or less in order to sufficiently lower the ratio of backward scattering light in total scattering light. By sufficiently reducing the ratio of backward scattering light in scattering light, black state of a reflection type liquid crystal display can be made blacker.

With regard to the refractive indices of the transparent polymer binder and spherical microparticles, the difference between them is preferable within 0.3, because backward scattering increases when the difference is large. It is particularly preferred that the refractive index of the transparent polymer binder is higher than that of the spherical microparticles in order to lower the ratio of backward scattering light in total scattering light. Specifically, the relative refractive index of the microparticles (value obtained by dividing the refractive index of the spherical microparticles by the refractive index of the transparent polymer binder, which is represented as n) preferably satisfies 0.91<n<0.99.

As such microparticles having a smaller refractive index than the transparent polymer binder, those of silica can be exemplified as inorganic particles, and those of silicone resins, polymethyl methacrylate resins and the like as organic particles.

The spherical microparticles may consist of either one or two or more kinds of such particles, so long as the particles satisfy the requirements described above. When two of more kinds of the spherical microparticles are used in admixture, they may be two or more kinds of the spherical microparticles different in their refractive indices, or they may be two or more kinds of the spherical microparticles different only in their diameters.

In addition to the aforementioned components, the light scattering layer 2 may contain a dispersant, leveling agent, colorant, plasticizer and the like as required.

With regard to the optical characteristics of the light scattering layer, it has a distinctness of image determined by the transmission method of 60.0% or more, more preferably 70.0% or more. At a distinctness of image of 60.0% or more, images obtained in a liquid crystal layer can be displayed with no blurring, and excellent image display clarity.

The substrates 3 function as supports on which the light scattering layer 2 is formed, and prevent formation of surface roughness of the light scattering layer 2 and, thereby, minimize backward scattering.

As the substrates 3, any material having a smooth surface can be employed. Examples of such materials include a plastic film such as those of polyethylene, polypropylene, polyethylene terephthalate, polycarbonate, polystyrene, polymethyl methacrylate, triacetyl cellulose and the like. In addition, paper or synthetic paper having a smoothened surface, etc. can be used.

The peelable substrate or substrates 3 may be subjected to surface treatment such as releasant treatment for ease of peeling from the light scattering layer 2.

When only one substrate is to be peeled from the light scattering layer 2, the other substrate which is not peeled (hereinafter referred as non-peelable substrate) is preferably composed of a transparent film of low optical anisotropy such as polycarbonate, polymethyl methacrylate, triacetyl cellulose or the like. A retardation film or a polarizer film may be also used for the substrate in order to prevent interfacial reflection loss.

In order to impart useful properties such as hard coat property and anti-reflection property to the non-peelable substrate 3, a hard coat layer, anti-reflection layer, non-glare layer, antistatic layer and the like can be provided on the outer surface of the non-peelable substrate. Each of these layers may be used alone, or they may be used in any combination.

While thickness of the substrates 3 is not particularly limited, it is preferably about 25–200 $\mu$m for ease of handling.

The peelable substrates 3 may be formed directly on the light scattering layer 2 or via another layer. They are preferably formed on the light scattering layer via an adhesive resin layer 4 so that the light scattering layer can be adhered to another member after the substrate 3 is peeled therefrom.

The adhesive resin layer 4 may be composed of at least one kind of the same adhesives as the aforementioned pressure adhesives, heat pressure adhesives and photosensitive adhesives.

An exemplary method for producing the front scattering film will be explained hereafter.

(1) Case that photosensitive adhesive is used as the transparent polymer binder

First, the aforementioned photosensitive adhesive is adjusted to a proper viscosity with a solvent or the like, and the aforementioned spherical microparticles are dispersed therein by stirring or the like to prepare a coating solution for the light scattering layer.

Figure 1:
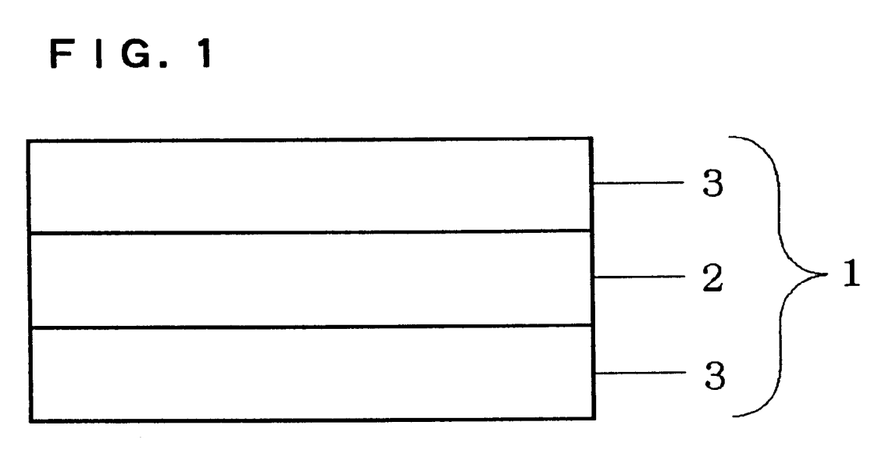
FIG. 1 represents a sectional view of an exemplary front scattering film of the present invention.

Then, the coating solution for light scattering layer is applied to one surface of a releasant-treated substrate 3 by a die coater, comma coater, bar coater, gravure coarter, reverse roll coater or the like to obtain a layer of predetermined thickness, and the applied layer is dried by heating or the like as suitable for the nature of the coating solution. Then, another releasant-treated substrate is laminated thereon to obtain a front scattering film 1 of the present invention.

After one of the substrates has been peeled from the thus obtained front scattering film 1, a retardation film is laminated thereon. Then the other substrate is peeled from the light scattering layer 2 and the light scattering layer 2 is adhered to a transparent glass substrate formed with a liquid crystal layer. Then, the light scattering layer 2 is bridged and cured by exposure to ionizing radiation so that the retardation film is strongly bonded via the light scattering layer 2 to the transparent glass substrate having the liquid crystal layer formed thereon.

(2) Case that two-part type polyurethane resin is used as the transparent polymer binder A mixture of polyol resin and isocyanate curing agent is adjusted to a proper viscosity with a solvent or the like, and the spherical microparticles are dispersed therein to prepare a coating solution for the light scattering layer.

Next, the coating solution for light scattering layer and, as required, a coating solution for pressure-sensitive adhesive layer are applied successively to the surface of a retardation film and dried. Then, a releasant-treated substrate is laminated by heat to cure the resin of the light scattering layer.

The substrate 3, the one formed on the adhesive layer if the adhesive layer is present, is removed and the light scattering layer 2 is bonded via the adhesive layer to a transparent glass substrate having the liquid crystal cell formed thereon.

The manufacturing process of the front scattering film of the present invention is not limited to the above-mentioned process. It can be changed depending upon, for example, the kind of the binder constituting the light scattering layer, whether the substrate can be peeled or not, or the kind of the substrate (retardation film, polarizer film or transparent film).

EXAMPLES

The present invention will be further explained hereinafter with reference to the following, examples. However, these examples should not be construed to limit the present invention. The terms "part(s)" and "%" are used on a weight basis unless otherwise indicated.

Figure 3:
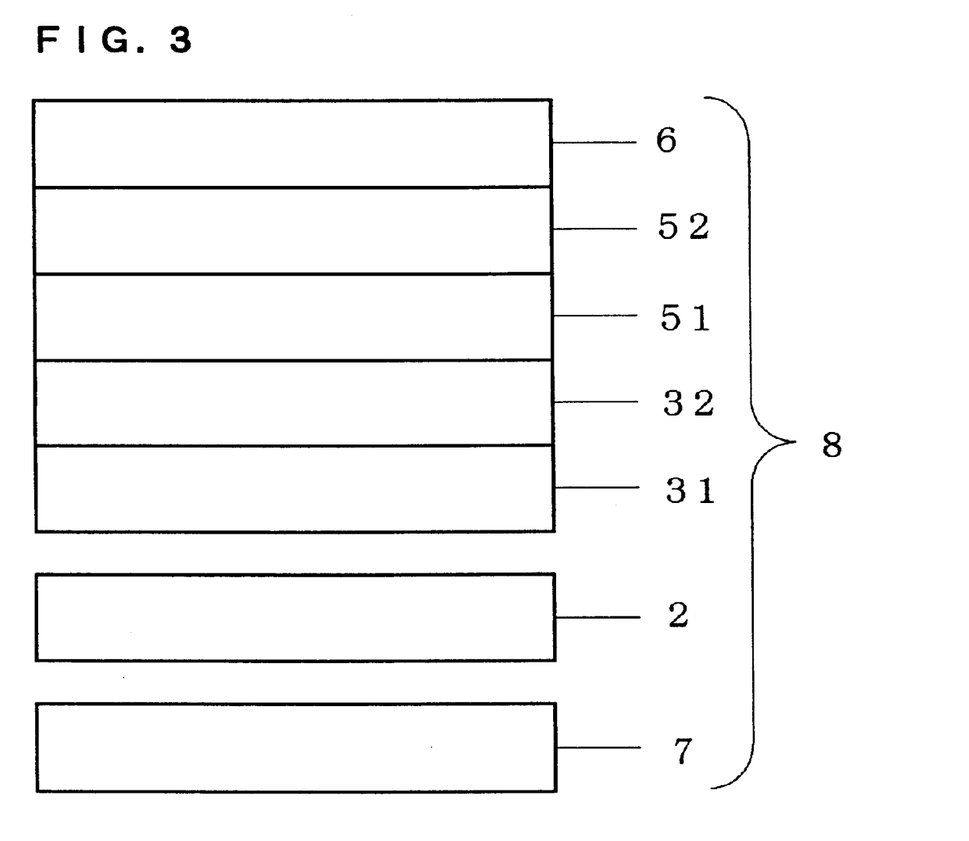
FIG. 3 represents a sectional view of an exemplary reflection type STN-LCD panel for evaluation.
Figure 4:
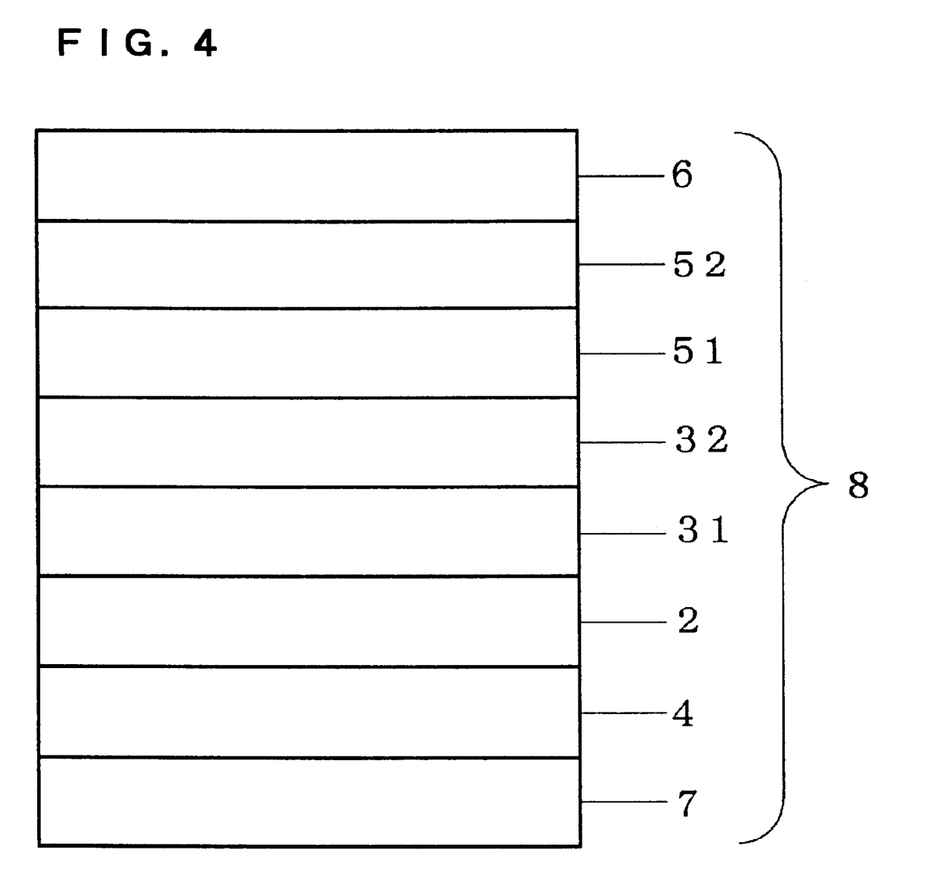
FIG. 4 represents a sectional view of another exemplary reflection type STN-LCD panel for evaluation.
Figure 5:
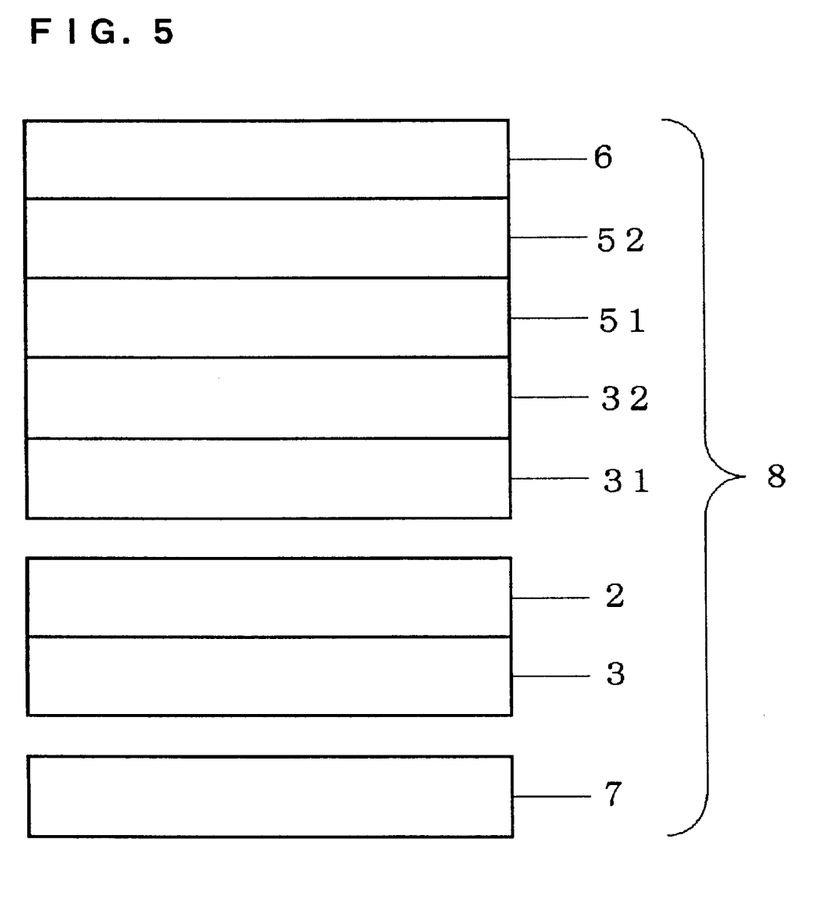
FIG. 5 represents a sectional view of yet another exemplary reflection type STN-LCD panel for evaluation.

FIGS. 3–5 represent structures of reflection type STN-LCD panels 8 which were manufactured to evaluate front scattering film s of Examples. In the reflection type STN-LCD panel 8, a light scattering layer 2 obtained from a front scattering film 1 of the present invention, a retardation film 31 (FIG. 6, "SUMIKALIGHT" (trade name): Sumitomo Chemical Co., Ltd.), a polarizer film 51 (FIG. 7, "SUMIKALAN" (trade name): Sumitomo Chemical Co., Ltd.) and a low reflection film 6 ("LeaLook" (trade name): Nippon Oil & Fats Co, Ltd.) were laminated on a liquid crystal cell 7 consisting of a glass substrate, mirror reflection electrode, an orientation film, a transparent electrode and a glass substrate.

The light scattering layer 2 (which may include a retardation film etc.) obtained from the front scattering film 1 was built into the panel in the manner described in each Example.

Results of visually evaluating appearance of a black part in a dark display portion and that of a white part in a bright display portion, contrast, and color (hue) are shown in Table 1. In Table 1, ○ indicates good, Δ indicates fair, X indicates poor.

Refractive indices of materials used in Examples and values of distinctness of image of front scattering films obtained in Examples are shown in Table 2. The refractive indices were measured using an Abbe refractometer (Model NAR-1T, Atago Co., Ltd.). The value of distinctness of image was measured by an image-clarity measuring apparatus (ICM-1DP, Suga Test Instruments Co., Ltd.) after the peelable substrate was peeled from each front scattering film obtained in Examples.

Example 1

To a releasant-treated surface of polyethylene terephthalate film 3 having a thickness of 25 μm, a coating solution a for light scattering layer having the following composition was applied and dried at 110° C. for 3 minutes to form a light scattering layer having a dry thickness of 35 μm. It was laminated on a releasant-treated surface of an identical polyethylene terephthalate film 3 at 70° C. and cured at 60° C. for two days to obtain a front scattering film 1 having the structure shown in FIG. 1.

<Coating Solution a for Light Scattering Layer>

Acryl polyol resin 100 parts (acryDic 56–898, solid content:50%, Dainippon Ink & Chemicals Inc.)

Isocyanate curing agent 12 parts (Takenate A3, solid content:75%, Takeda Chemical Industries, Ltd.)

Silicone resin particle 2.95 parts (Tospearl 120, Toshiba Silicone Co.)

Methylethyl keton 25 parts

Toluene 25 parts

Both polyethylene terephthalate films 3 were peeled from the thus obtained front scattering film 1 and the light scattering layer 2 was placed on a liquid crystal cell 7. A material obtained by laminating a retardation film 31, polarizer film 51, and low reflection film 6 by adhesive layers (32, 52) was superimposed onto the liquid crystal cell 7 to obtain a LCD panel 8 having the structure shown in FIG. 3.

Example 2

Figure 2:
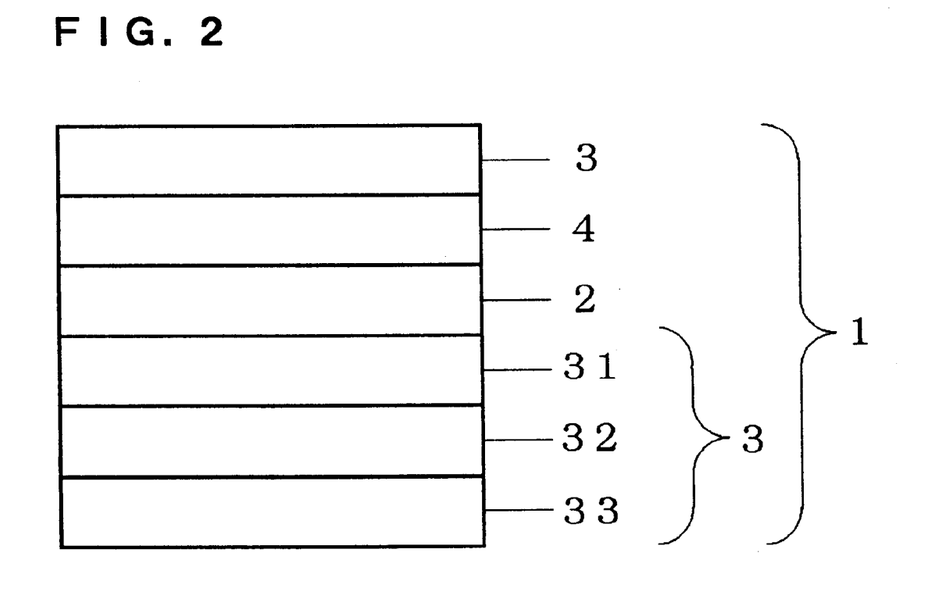
FIG. 2 represents a sectional view of another exemplary front scattering film of the present invention.
Figure 6:
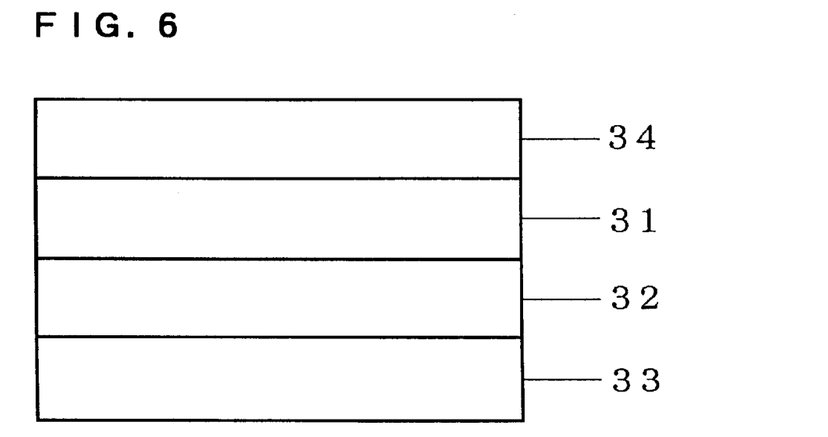
FIG. 6 represents a sectional view of an exemplary retardation film used in the light scattering film of the present invention.
Figure 7:
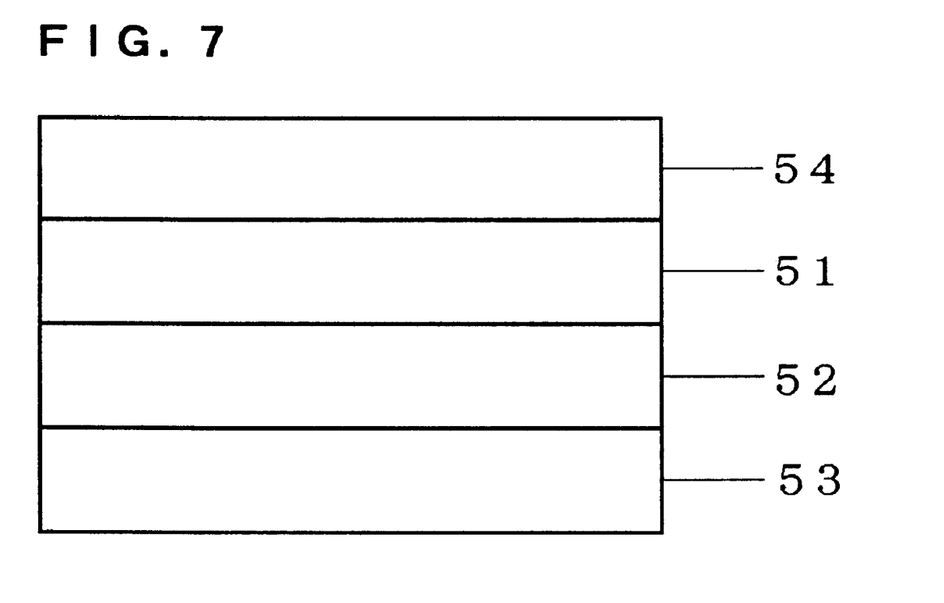
FIG. 7 represents a sectional view of an exemplary polarizer film used in the light scattering film of the present invention.

A coating solution b for light scattering film and a coating solution for pressure-sensitive adhesive layer, each of which had the following composition, were applied successively to a retardation film 31 (FIG. 6, "SUMIKALIGHT" (trade name): Sumitomo Chemical Co., Ltd.) after a protect film 34 was peeled from the retardation film. The applied layers were dried to form a light scattering layer 2 of a dry thickness of 35 μm and a pressure-sensitive adhesive layer 4 of a dry thickness of 10 μm. The result was laminated onto a lubricant surface of the same polyethylene terephthalate film 3 as that of Example 1 to obtain a front scattering film 1 having the structure shown in FIG. 2.

<Coating Solution b for Light Scattering Layer>

Polyester resins 50 parts (Vyron 200: Toyobo Co., Ltd.)

Silicone resin particles 2.5 parts (Tospearl 120:GE Toshiba Silicone Co.)

Methylethyl keton 25 parts

Toluene 25 parts

<Coating Solution for Pressure-sensitive Adhesive Layer>

Acrylic adhesive 50 parts (Olibain BPS1109, solid content:40%,

TOYO INK MFG. Co., Ltd.)

Curing agent 1.2 parts (Olibain BHS8515, TOYO INK MFG.Co., Ltd.)

Ethyl acetate 50 parts

A separator film 33 was peeled from the retardation film 31 of thus obtained front scattering film 1 and it was laminated on a polarizer film 51 (FIG. 7) after a protective film 54 thereof was removed. A separator film 53 of the polarizer film 51 was peeled therefrom and it was laminated on a low reflective film 6 via adhesive layer 52. Then, the other polyethylene terephthalate film 3 was peeled off from the front scattering film 1 and it was laminated on a liquid crystal cell 7 to obtain an LCD panel 8 having the structure shown in FIG. 4.

Comparative Example 1

To polyethylene terephthalate film having a thickness of 25 μm (T-60: Toray Industry, Inc.), which was not releasant-treated, coating solution for light scattering layer having the same composition as that of Example 1 was applied and dried at 140° C. for five minutes to form a light scattering layer 2 having a thickness of 35 μm. The light scattering layer 2 was cured at 60° C. for two days to obtain a front scattering film.

Thus obtained front scattering film was placed on a liquid crystal cell 7 in the same manner as in Example 1 so that the polyethylene terephthalate film was in contact with the liquid crystal cell 7. A material prepared by laminating a retardation film 31, polarized light film 51, and low reflection film 6 via adhesive layers 32, 52 was laminated on the liquid crystal cell 7 to obtain an LCD panel 8 having the structure shown in FIG. 5.

TABLE 1

|  | Appearance of dark/bright display portions | Contrast | Color aspect |
|---|---|---|---|
| Example 1 | Black part of dark display portion was slightly whitened<br>White part of bright display portion was not colored | Δ | ○ |
| Example 2 | Black part of dark display portion was not whitened<br>White part of bright display portion was not colored | ○ | ○ |
| Comparative example 1 | Black part of dark display portion was markedly whitened<br>White part of bright display portion was colored | X | X |

As clearly seen from the results shown in Table 1, since the light scattering layer 2 of Comparative example 1 was not disposed between polyethylene terephthalate films during production, the surface of the light scattering layer 2 was roughed by the spherical microparticles. Consequently, the dark display portion (black) of the liquid crystal was whitened and the contrast of a bright portion (white) was lowered. In addition, since the front scattering film including the polyethylene terephthalate film 3 was sandwiched between the liquid crystal cell 7 and the retardation film 31 without removing the polyethylene terephthalate film 3 therefrom, polarization was affected by the polyethylene terephthalate film 3. As a result, the bright (white) portion was colored and the color property of display was degraded.

On the other hand, in Examples 1 and 2, since the light scattering layer 2 was built into the LCD panels of Examples 1 and 2 after removing the polyethylene terephthalate film 3 which affects the polarization, the color property of the bright display (white) portion was not degraded. In Example 1, however, since the light scattering layer 2 did not make sufficiently close contact with the liquid crystal cell 7 and the retardation film 31, i.e., contacted them via air interfaces, the contrast was slightly lowered.

|  |  | Example 1 | Example 2 |
|---|---|---|---|
| Refractive index | Binder (after cured) | 1.50 | 1.56 |
|  | Microparticles | 1.44 | 1.44 |

-continued

|  | Example 1 | Example 2 |
|---|---|---|
| Relative refractive index | 0.96 | 0.92 |
| Distinctness of image ($C_{0.125}$) | 77.8% | 71.2% |

What is claimed:

1. A front scattering film comprising a light scattering layer composed of a transparent polymer binder and spherical microparticles having a mean particle diameter of 1.0–10.0 μm, dispersed in the binder, and having a refractive index different from that of the binder, and substrates provided on and in contact with both sides of the light scattering layer, said substrates having smooth surfaces to prevent formation of surface roughness on the light scattering layer and to prevent the spherical microparticles from protruding from a surface of the light scattering layer, wherein at least one of the substrates is peelable from the light scattering layer.

2. A front scattering film according to claim 1, wherein a ratio n of a refractive index of the spherical microparticles to that of the transparent polymer binder satisfies 0.91<n<0.99.

3. A front scattering film of claim 1, wherein thermosetting resin or ionizing radiation curable resin is used as the transparent polymer binder.

4. A front scattering film of claim 1, wherein adhesive resin is used as the transparent polymer binder.

5. A front scattering film of claim 1, wherein at least one of the substrates is formed on the light scattering layer via an adhesive resin layer.

6. A front scattering film of claim 1, wherein one of the substrates is a polarizer film or retardation film.

7. A front scattering film according to claim 1 wherein said mean particle diameter is 2.0–6.0 μm.

8. A front scattering film according to claim 1, wherein both substrates are in direct contact with said light scattering layer.

9. A front scattering film according to claim 1 wherein both of said substrates are peelable from the light scattering layer.

10. A front scattering film according to claim 1 wherein both of said substrates are peelable from the light scattering layer.

11. A front scattering film comprising a light scattering layer composed of a transparent polymer binder and spherical microparticles dispersed in the binder and having a refractive index different from that of the binder, wherein the light scattering layer is formed between and in contact with two substrate sheets, said substrate sheets each having smooth surfaces to prevent formation of surface roughness on the light scattering layer and to prevent the spherical microparticles from protruding from a surface of the light scattering layer and at least one of the substrates is peelable from the light scattering layer.

* * * * *